United States Patent [19]

Chakravorty et al.

[11] Patent Number: 5,168,542
[45] Date of Patent: Dec. 1, 1992

[54] LOW LOSS CHANNEL WAVEGUIDE AND METHOD FOR MAKING THE SAME

[75] Inventors: Kishore K. Chakravorty, Issaquah; Chung-Ping Chien, Redmond, both of Wash.

[73] Assignee: The Boeing Company, Seattle, Wash.

[21] Appl. No.: 773,158

[22] Filed: Oct. 9, 1991

[51] Int. Cl.⁵ .................... G02B 6/10; G03G 15/00
[52] U.S. Cl. ........................ 385/132; 385/14; 385/130; 385/131; 430/56; 430/83; 430/130
[58] Field of Search .............. 385/14, 88, 89, 129, 385/130, 131, 132; 437/51, 36, 143, 147, 148, 152, 153, 162, 163; 430/56, 130, 80, 83, 59, 69, 66, 132, 133

[56] References Cited

U.S. PATENT DOCUMENTS

| | | |
|---|---|---|
| 4,831,628 | 5/1989 | Tsang ............................ 385/132 |
| 4,941,725 | 7/1990 | Normandin ......................... 385/1 |
| 5,054,872 | 10/1991 | Fan et al. ........................ 385/130 |
| 5,061,029 | 10/1991 | Ishikawa ......................... 385/132 |
| 5,093,883 | 3/1992 | Yoon et al. ...................... 385/130 |
| 5,094,517 | 3/1992 | Franke ............................ 385/12 |
| 5,095,518 | 3/1992 | Young et al. .................... 385/130 |
| 5,100,589 | 3/1992 | Ticknor ........................ 385/132 X |
| 5,106,211 | 4/1992 | Chiang et al. .................... 385/132 |

Primary Examiner—Brian Healy
Attorney, Agent, or Firm—Christensen, O'Connor, Johnson & Kindness

[57] ABSTRACT

Optical waveguides for use in planar structures, such as dielectric layers in multichip modules exhibit low optical loss. The optical waveguides are provided by methods that involve doping of the dielectric layers. The waveguides can be used to interconnect electronic elements and transmit signals at speeds that are compatible with high speed electronic elements.

25 Claims, 8 Drawing Sheets

LOW LOSS CHANNEL WAVEGUIDE AND METHOD FOR MAKING THE SAME

FIELD OF THE INVENTION

The present invention relates to waveguides for electromagnetic waves for use in electronic and microelectronic applications and methods for making such waveguides.

BACKGROUND OF THE INVENTION

Semiconductor device fabrication technology has entered the ultra-large scale integration (ULSI) domain with submicron sized device structures. This increased level of integration has significantly improved the switching speeds of the integrated circuits; however, full utilization of the faster integrated circuits in configuring high-performance systems requires a comparable advance in the technology used to interconnect the device structures. At present, interconnection technology has clearly emerged as the performance limiting factor in high speed systems. Prior methods of interconnection have suffered from the inability to satisfactorily address issues in addition to speed, such as power dissipation, cross-talk, and fan-out. All of the issues must be addressed in order to take full advantage of the ultra-large scale integration technology.

Transmission of optical signals through optical waveguides has found application in such fields as telecommunications, biomedical monitoring systems and other analytical applications. Prior attempts to extend this technology to the microelectronic industry have produced less than satisfactory results. One drawback has been the inability to obtain a high enough difference in the index of refraction of the waveguides and the index of refraction of the surrounding medium. Without a large enough difference, leakage of signals from the waveguides can rise to unsatisfactory levels. Signal leakage is undesirable because of the potential for cross-talk between adjacent waveguides. Although the degree of cross-talk can be reduced by spacing the waveguides a sufficient distance apart, such a remedy is generally unsatisfactory in applications where dense packing of components is a requirement. Another drawback was inadequate thermal stability of the waveguides when subjected to normal processing conditions.

The developing multi-chip module packaging technology promises higher connectivity, faster electrical performance, more efficient thermal management and better reliability. Dielectric materials, such as polyimide, with its low dielectric constant and superior planarization characteristics, is playing a key role in the metal/polyimide hybrid wafer scale integration technology. Nonplanar ridge waveguides have been used as pathways for guiding electromagnetic waves in polyimides. While suitable for some purposes, these ridge-type waveguides with their vertical profile are not suitable for use in technology, such as multi-chip module packaging, which requires a planar structure so that multiple layers of elements or components can be stacked on top of one another.

Any newly developed connection system should be compatible with other elements in the integrated circuit and should not adversely impact their function. The connection should efficiently transmit signals without losses that will result in unsatisfactory performance of the integrated circuit.

The low-loss channel waveguides formed in accordance with the present invention provide a solution to the problems which heretofore have remained unsolved.

SUMMARY OF THE INVENTION

Low loss channel waveguides formed in accordance with the present invention provide optical interconnections between elements in electronic or microelectronic circuits. The channel waveguides serve as pathways for the transmission of information in the form of electromagnetic waves between electronic elements in a circuit. The waveguides in accordance with the present invention are formed totally within the substrate through which they are intended to guide light, and do not necessarily effect any of the dimensions or surface morphology of the substrates. The channel waveguides have definite horizontal and vertical boundaries, and are significantly narrower than planar waveguides where typically the horizontal dimension of the waveguide is much greater than the vertical dimension. The channel waveguides do not necessarily change the planar profile of substrates in which they are formed, and accordingly, are particularly suitable for use with multi-layered, multi-chip module packaging technologies. The channel waveguides efficiently transmit electromagnetic waves, such that leakage of signals and signal losses are sufficiently low to avoid cross-talk and power dissipation problems.

In one embodiment, a channel waveguide formed in accordance with the present invention comprises a channel for guiding electromagnetic waves defined within a polyimide substrate which includes a dopant that alters the index of refraction of the polyimide. In another embodiment, the channel is defined between doped portions of a dielectric material. The doped portions have an index of refraction different from the index of refraction of the channel. In a third embodiment, the channel has a transverse cross-section substantially in the shape of a rectangle defined in a dielectric material and includes a dopant to alter the index of refraction of the dielectric material. Channel waveguides formed in accordance with the present invention can be incorporated into electronic packaging, such as multichip-module packaging.

One method for providing channel waveguides within a polyimide in accordance with the present invention includes the steps of depositing a masking material on the polyimide, patterning the masking material to uncover a portion of the polyimide, and introducing a dopant into the uncovered portions of the polyimide. In this method, the dopant serves to effectively alter the index of refraction of the polyimide.

Another method for forming channel waveguides involves the steps of treating a dielectric material to render portions thereof resistant to diffusion by a solvent that will be used to carry a dopant into the dielectric material by solvent diffusion. Dopant is then introduced into those portions of the dielectric material that were not rendered resistant to diffusion by the solvent. In this embodiment, the channel waveguides can be defined between the doped portions of the dielectric material, or in the doped portions of the dielectric material, depending on whether the dopant increases or decreases the index of refraction of the dielectric material.

BRIEF DESCRIPTION OF THE DRAWINGS

The foregoing aspects and many of the attendant advantages of this invention will become more readily apparent and better understood by reference to the following detailed description, when taken in conjunction with the accompanying drawings, wherein.

DETAILED DESCRIPTION OF THE PREFERRED EMBODIMENT

The channel waveguides formed in accordance with the present invention provide particular advantages when used to interconnect integrated circuits that are packaged in a multi-chip module. Although the present invention will be described in the context of interconnections between electronic elements in a multi-chip module, the channel waveguides can be used in other applications where a waveguide for electromagnetic waves in a planar article is needed.

Figure 1:
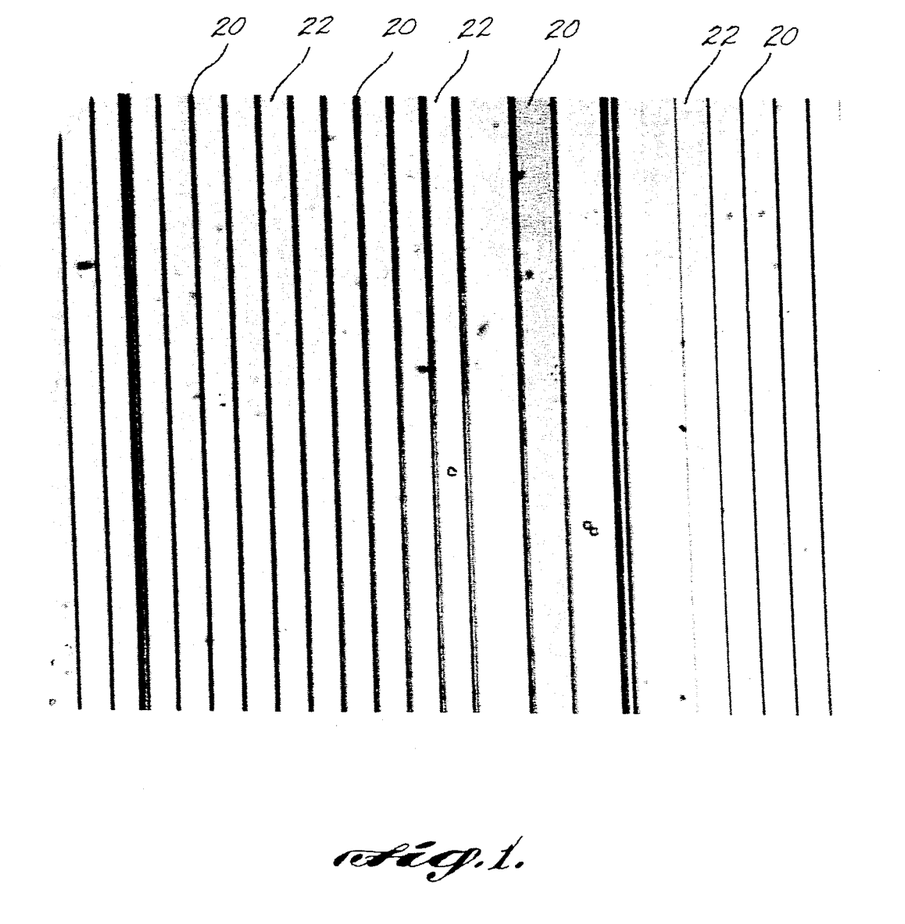
FIG. 1 is an optical photomicrograph showing the top view of channel waveguides formed between portions of a dielectric material rendered resistant to solvent diffusion in accordance with one embodiment of the present invention.

Referring to FIG. 1, channel waveguides 20 formed in accordance with the present invention are provided in a layer of a dielectric material 22. Channel waveguides 20 have a higher index of refraction than the surrounding dielectric material 22. In accordance with Snell's law, these differing indices of refraction result in the waveguides internally reflecting and transmitting electromagnetic waves introduced into one end. In accordance with the present invention, the higher index of refraction of the channel waveguide 20 is provided by introducing a dopant into certain portions of the layer of the dielectric material 22.

In one embodiment described below, the dopant increases the index of refraction of the doped region, and accordingly, the doped region defines the channel waveguide. Alternatively, as described below in more detail, the dopant decreases the index of refraction of the doped region, in which case, the channel waveguide is defined between the doped regions.

The channel waveguides are provided by the methods disclosed herein. One such method includes the steps of providing a masking layer over a layer of dielectric material. The masking layer is then patterned and developed to uncover a portion of the dielectric material. The dielectric material and the remaining portions of the masking layer are then immersed in a diffusion bath that includes a dopant and a solvent capable of diffusing into the dielectric material. The solvent passes through the opening in the masking layer and diffuses into the dielectric material. The dopant is carried into the dielectric material by the solvent and remains there after the solvent is removed by baking.

Another method also described herein provides a channel waveguide in a different manner. In this method, portions of the dielectric material are treated to render them resistant to diffusion by the solvent in the diffusion bath discussed above. This can be accomplished, for example, by exposing the dielectric material to ultraviolet radiation through a mask. Once portions of the dielectric material have been rendered resistant to diffusion by the solvent in the diffusion bath, the entire layer of dielectric material is immersed in the diffusion bath. The solvent diffuses into those portions of the dielectric material that have not been rendered resistant to diffusion by the solvent (e.g., those portion that were to exposed to the ultraviolet radiation). When the solvent is removed from the dielectric material, for example, by evaporation, the dopant is left behind and alters the index of refraction of the doped portions.

Electromagnetic waves that can be guided by channel waveguides formed in accordance with the present invention include those waves that can be guided along an optical pathway by internal reflection according to Snell's law. In order for the electromagnetic waves to be guided by the waveguide, they must not be absorbed by the waveguide. In multi-chip module packaging where polyimide is typically used as a dielectric material, electromagnetic waves having wavelengths falling within the visible and infrared spectrum can be used since they are not absorbed to any appreciable degree by polyimide.

The wavelengths of the electromagnetic waves will affect the type of dopant used. For instance, if electromagnetic waves in the visible spectrum are to be transmitted by the channel waveguides, the dopant should also transmit visible wavelengths. Likewise, if infrared wavelengths are to be transmitted, the dopant should transmit infrared wavelengths. Generally, if the dopant absorbs the transmitted electromagnetic waves, signal losses and power dissipation will be unsatisfactorily high.

One example of a dielectric material in which channel waveguides can be formed is polyimide. Polyimides are typically used in the electronics industry to provide a substrate for microelectronic elements in multi-chip modules. The polyimides serve as an electrical isolation means between the microelectronic elements. Because of the interest in dense packing of microelectronic elements to minimize the circuit size, polyimide layers are typically designed to be planar, which allows multiple layers to be stacked on top of each other. The channel waveguides and methods in accordance with the present invention are compatible with such planar dielectric layers. The channel waveguides can be formed within planar dielectric layers without altering the planarity of such layers.

Dielectric materials in which channel waveguides formed in accordance with the present invention can be provided should not absorb the light which is to be transmitted in the channel waveguides. Examples of suitable dielectric materials include, polycarbonates, epoxy resins, polymethylmethacrylates, and polyimides. Particularly suitable polyimides include those that are preimidized and are photosensitive; however, precursor-type polyimides and nonphotosensitive polyimides are also suitable. Polyimides are preferred in microelectronic applications because of their low dielectric constant and superior planarization characteristics. The preimidized and photosensitive polyimides are preferred because of the fewer processing steps needed to pattern and render such polyimides insoluble compared to nonphotosensitive polyimides and polyimide precursors. Although the present invention is described below in terms of an exemplary dielectric, polyimide, it is understood that the present invention is not so limited and may be used with other types of dielectric materials, including, but not limited to the ones listed above.

Polyimides used to provide layers of dielectric material in multi-chip modules are conventional and available commercially from such sources as Ciba-Geigy Corporation. One such polyimide available from Ciba-Geigy Corporation includes a photosensitive BTDA (benzophenone tetracarboxylic dianhydride)-alkylated diamine based preimidized polyimide commercially available under the name Probimide TM 414. This polyimide is provided by the manufacturer as a solution of polyimide in 4-butyrolactone.

An important characteristic of Probimide TM 414 polyimide is that it remains susceptible to diffusion by solvents, such as 4-butyrolactone, even after baking at temperatures up to about 350° C. or exposure to low dosages of ultraviolet radiation; however, the susceptibility to diffusion decreases with increasing baking temperatures and times as well as dosages of radiation. For example, for a polyimide film baked at 150° C., diffusion was completed in about 20 seconds at 50° C. When an identical film was baked to 350° C., the diffusion time under the same conditions increased to about 14 minutes. As described below, diffusion of a solvent into the polyimide is a vehicle by which a dopant can be introduced into the polyimide.

In one embodiment, channel waveguide 20 in dielectric layer 22 includes a dopant that alters the index of refraction of the material making up the dielectric layer. The dopant must alter the index of refraction of the dielectric material a sufficient amount to provide a difference between the index of refraction of the waveguide and the index of refraction of the surrounding dielectric material such that transmitted electromagnetic waves will be guided by internal reflection. The dopant should be capable of being diffused into the dielectric material and dissolved in a solvent that can diffuse into the dielectric material. The dopant should not adversely affect the other desirable properties of the dielectric material. For example, the dopant should not precipitate or create large inhomogeneities in the index of refraction once it is diffused into the dielectric material. As discussed above, the dopant should not absorb the electromagnetic waves which are to be transmitted through the channel waveguides. Disperse red is one example of a suitable dopant when the channel waveguides will transmit infrared wavelengths. While disperse red absorbs electromagnetic waves in the visible spectrum, it does not absorb to any appreciable degree, electromagnetic waves having wavelengths falling within the near infrared region of the spectrum (e.g., 850 nanometers). If electromagnetic waves having wavelengths falling in the visible region of the spectrum are to be guided, a dopant that does not absorb such wavelengths should be chosen.

Alternatively, rather than providing a channel waveguide by doping portions of the dielectric layer that will serve as the waveguide, the waveguides can be provided by doping portions of the dielectric layer that will not serve as a waveguide. In other words, the channel waveguides can be provided by doping certain portions of the layer of dielectric material to lower their index of refraction. For example, in a polyimide dielectric layer, polymethylmethacrylate (PMMA) in a methylene chloride solvent can be diffused into non-light guiding portions of a polyimide layer. The PMMA has a lower refractive index than the polyimide, so incorporation of PMMA into polyimide would be expected to lower the index of refraction of the doped regions which effectively provides the needed difference in indices of refraction to enable the undoped portions to act as a channel waveguide.

In either case, the dopant preferably alters the index of refraction of the dielectric material by a sufficient amount to allow the channel waveguide to transmit electromagnetic waves without appreciable signal leakage. In theory, a difference in indices of refraction on the order of 0.001 would allow a channel waveguide to guide light. However, when the difference in indices of refraction are this small the leakage of signals is such that the distance between adjacent waveguides must be increased in order to avoid cross-talk between waveguides. This is an unsatisfactory remedy in situations where dense packing of all components is a major design requirement.

The concentration of dopant introduced into the dielectric material will vary, depending on the type of dopant and the dielectric material being used. As a general guideline, too low a concentration of dopant in the dielectric material will result in an insignificant change in the index of refraction. On the other hand, excessive concentrations of dopant will result in unsatisfactory signal losses due to scattering of the transmitted electromagnetic waves.

Figure 3:
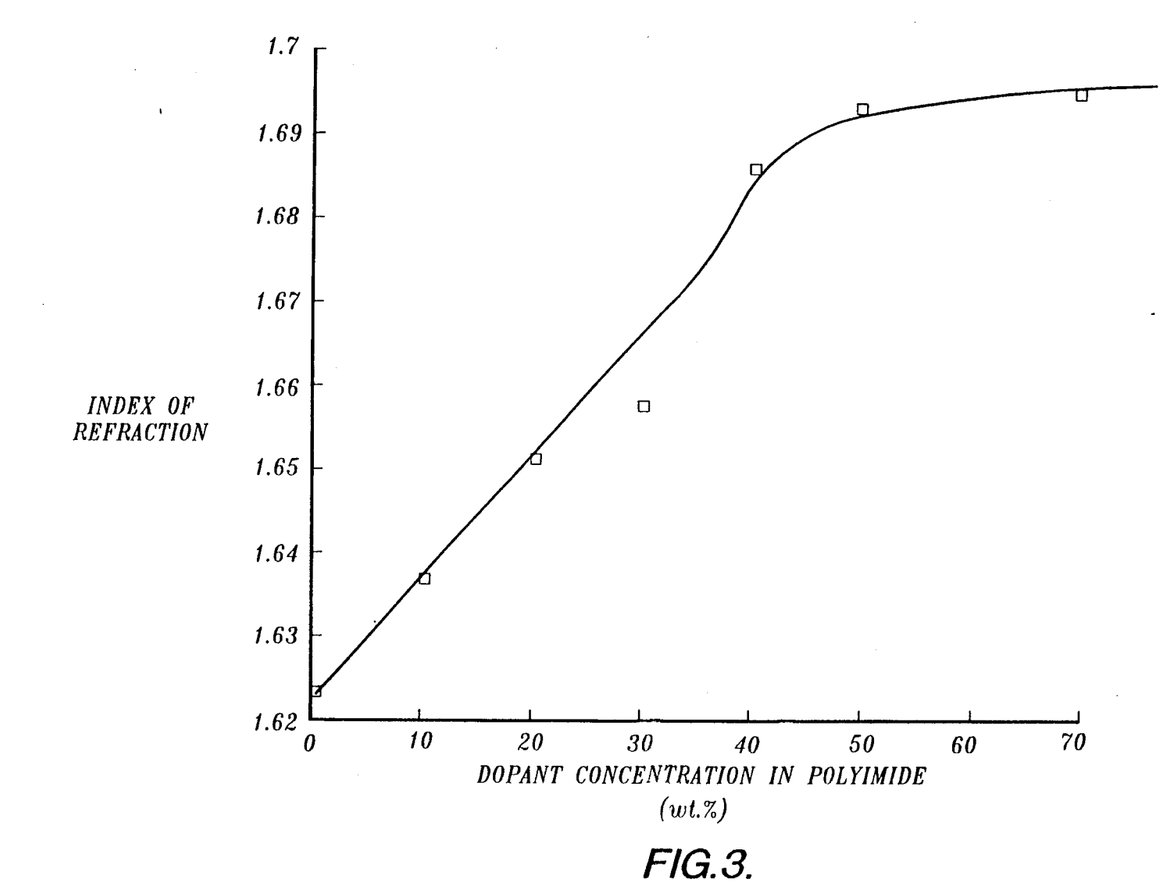
FIG. 3 is a graph illustrating the index of refraction of a polyimide film as a function of the concentration of dopant in the polyimide.

Referring to FIG. 3, the effect of the dopant concentration (weight % in the polyimide) on the index of refraction is illustrated for a film of Probimide TM 414 polyimide doped with disperse red. The index of refraction increases steadily with increasing concentrations of the disperse red up to about 50 weight %. Above about 50 weight %, the increase in the index of refraction with increasing concentration tapers significantly.

Figure 4:
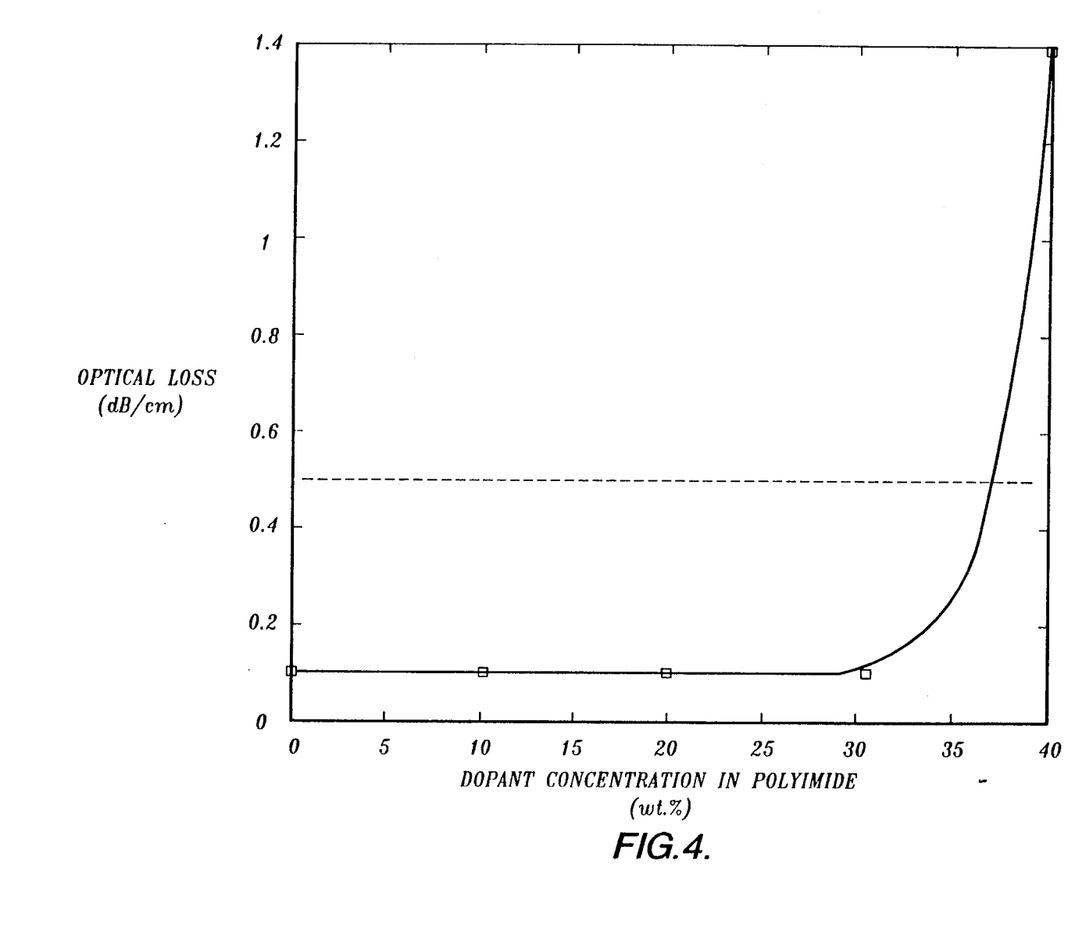
FIG. 4 is a graph illustrating the optical loss from a polyimide film, as a function of the concentration of the dopant in the polyimide.

As noted above, the dopant concentration should not be so high that loss of transmitted waves from the waveguide due to scattering is unsatisfactory. Referring to FIG. 4, the optical loss (in decibels/centimeter) from a film of Probimide TM 414 polyimide as a function of different doping concentrations is illustrated. Undoped films of polyimide are reported to exhibit low scattering losses, on the order of 0.3 dB/cm or less. At doping concentrations below about 30 weight % in polyimide, FIG. 4 shows that the film exhibits no observable increase in the optical loss. As the concentration of the dopant increases above 30 weight %, the optical loss begins to increase dramatically. FIG. 4 should not be interpreted to indicate that optical loss from the doped polyimide is about 0.1 dB/cm, since the accuracy of the measurement technique is believed to be on the order of 0.5 dB/cm.

Figure 5:
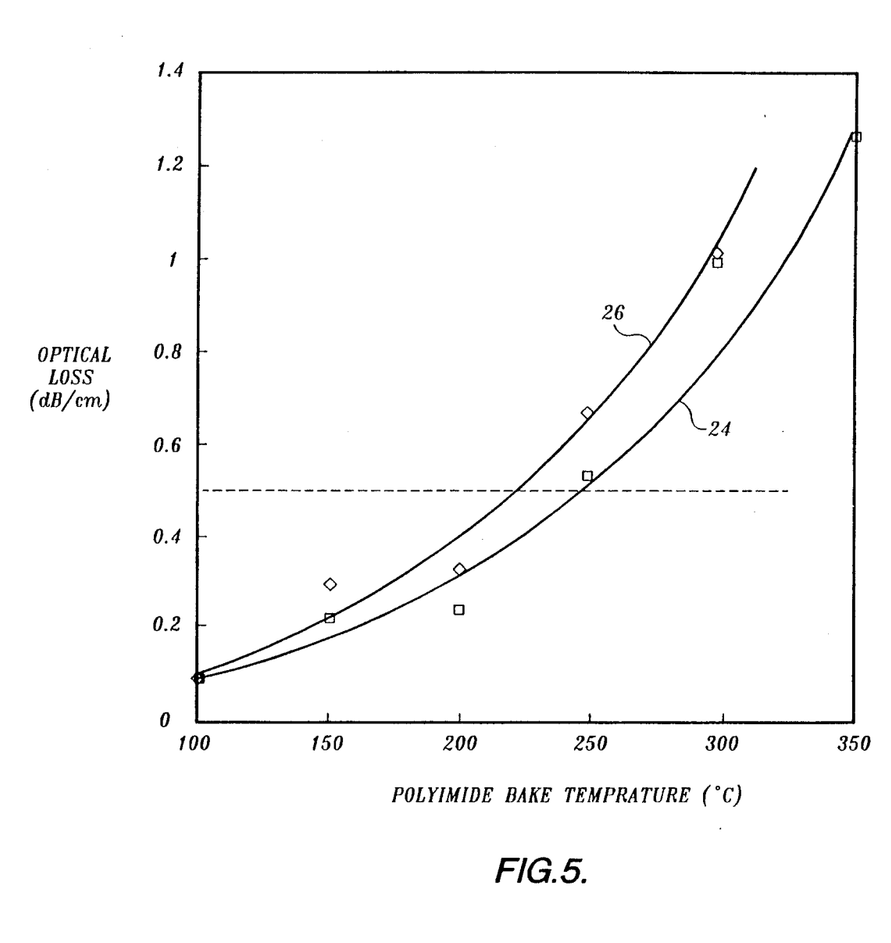
FIG. 5 is a graph illustrating the differences in optical loss values between a doped polyimide films and undoped polyimide films as a function of the temperature at which the polyimide is baked.

Applicants have observed that films of Probimide TM 414 polyimide demonstrate scattering losses of less than 0.5 dB/cm for processing temperatures of less than about 250° C. In FIG. 5, scattering losses in doped films of Probimide ™ 414 polyimide baked at different conditions are represented by line 24. Scattering losses for substantially identical films of polyimide without dopant are represented by line 26. As the baking temperature increases, the optical loss increases for both samples. The small differences in optical loss between the doped and undoped samples at similar baking temperatures indicates that use of the dopant does not have a substantial adverse affect on the optical losses from the polyimide. Again, the accuracy of the measurement technique was about 0.5 dB/cm.

The dielectric layer in which the channel waveguides are to be provided can be provided by a number of methods. One example for providing a layer of polyimide includes spin coating the polyimide onto a substrate such as a glass or silicon wafer. If a multi-chip module is to be provided, the polyimide may also be spin coated over another layer of dielectric material that carries microelectronic elements and interconnects. After the polyimide is spin coated and allowed to planarize, it is baked to remove solvent. Baking temperatures between about 110° C. to 150° C. are suitable. To avoid oxidation of the polyimide, baking under a nitrogen purge is effective. Ultraviolet radiation (e.g., 365 nanometers) can then be used to decrease the solubility of the polyimide in the solvent to be used in the diffusion bath. Depending on the conditions of the first baking step and the ultraviolet radiation exposure, a second baking step may be necessary to ensure that the polyimide is insoluble in the solvent of the diffusion bath. Since heating the dielectric material also reduces its susceptibility to diffusion by solvents, the baking conditions (e.g., temperature and time) should be controlled to ensure that solvent can continue to diffuse into the dielectric layer in a satisfactory period of time. If the baking conditions are too extreme, the time needed to diffuse solvent carrying dopant into the dielectric layer can become unreasonably long. On the other hand, if the dielectric layer is not baked sufficiently prior to immersion in the solvent of the diffusion bath, it may still be soluble enough that delamination of the polyimide from the substrate occurs.

Figure 6A:
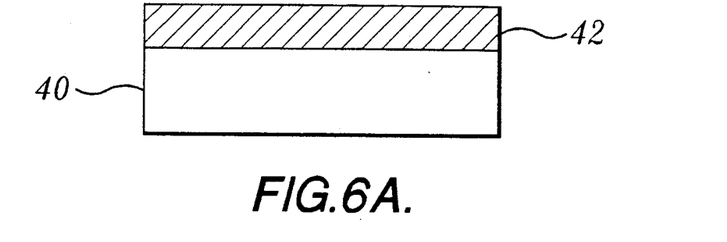
FIGS. 6A-6D is a flow diagram schematically illustrating one method for producing channel waveguides in accordance with the present invention.
Figure 6B:
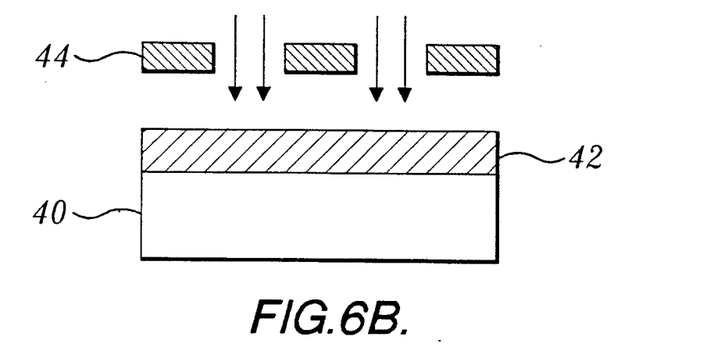

Referring to FIG. 6A, a transverse cross section of a substrate 40 with polyimide dielectric layer 42 provided thereon is illustrated. Layer 42 has been treated to render it insoluble in the solvent of the diffusion bath as described above. In FIG. 6B, polyimide layer 42 is exposed to a dosage of ultraviolet radiation through a mask 44, using a conventional aligner. The exposure to ultraviolet radiation should render the exposed portions 46 in FIG. 6C resistant to diffusion by the solvent in the diffusion bath, while unexposed portions 47 in FIG. 6C continue to be susceptible to diffusion by the solvent. For Probimide ™ 414 polyimide, exposure to a mercury lamp emitting wavelengths of 365, 406 and 436 nanometers can render the polyimide more resistant to diffusion by solvents, such as 4-butyrolactone. The length of time needed for this exposure will depend upon the thickness of the polyimide and the power of the radiation source. As an alternative to a mercury lamp, a source of deep ultraviolet wavelengths can be used to render the polyimide more resistant to diffusion by the solvent in the diffusion bath. Deep ultraviolet light sources emitting wavelengths of about 250 nanometers can be used for this purpose.

Figure 6C:
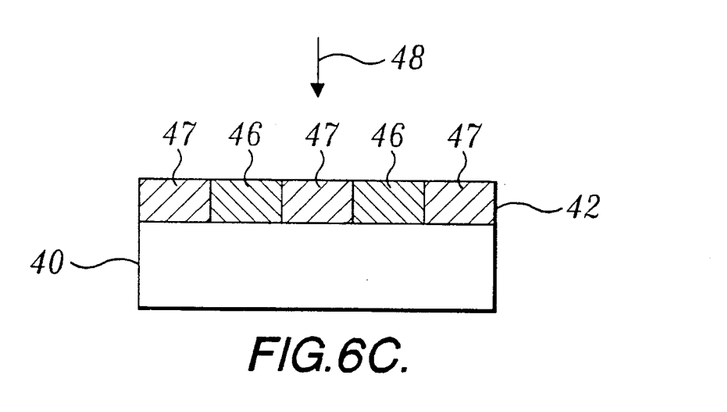

Dopant in solution, generally indicated by reference numeral 48 in FIG. 6C can then be introduced into portions 47 by immersing substrate 40 and dielectric layer 42 in a diffusion bath of solvent and dopant. The dopant will change the index of refraction of the unexposed portions 47 of the polyimide, thus defining channel waveguides 50 in FIG. 6D between exposed portions 46. The solution does not diffuse into exposed portions 46 because the second exposure to ultraviolet radiation has rendered them more resistant to such diffusion compared to portions 47. As discussed above, the length of time needed to complete the diffusion will depend upon the baking temperatures and initial ultraviolet exposure that the polyimide has been subjected to prior to the diffusion. Generally, higher baking temperatures, longer baking times, and higher dosages translates into longer diffusion times. After the diffusion is completed, the surface of the polyimide should be rinsed to remove solvent and dopant on the surface. The polyimide can be air dried then baked to remove the diffused solvent from the polyimide, leaving behind the dopant. The embodiment described above is preferred when the direction of the diffusion of solvent into the polyimide should not be isotropic. This is typically the case when one wishes to define a waveguide that extends from the top to the bottom of the dielectric layer and which is not excessively wide such that dense packing of the waveguides is not feasible.

Figure 6D:
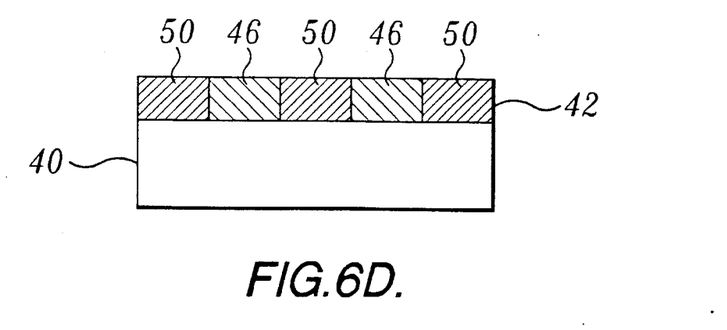

The method described above allows one to accurately control the shape and location of the waveguides 50. Since portions 46 can be defined precisely by the ultraviolet radiation exposure and since the dopant can only be diffused between portions 46, channel waveguides 50 can be precisely defined to have a cross-section in substantially the shape of a rectangle.

Figure 7A:
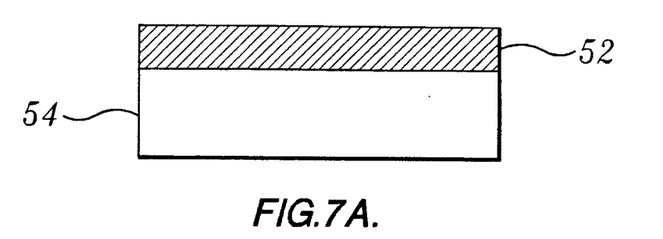
FIG. 7A-7H is a flow diagram schematically illustrating another method for producing channel waveguides in accordance with the present invention.
Figure 7B:
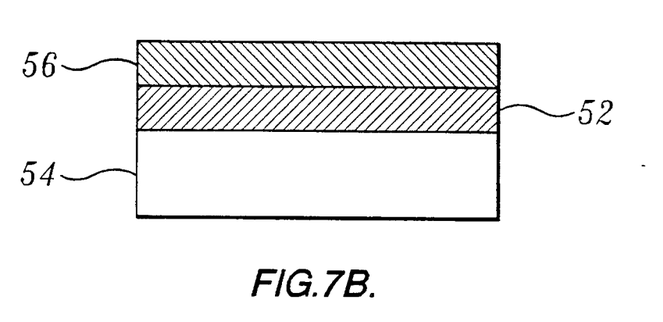
Figure 7C:
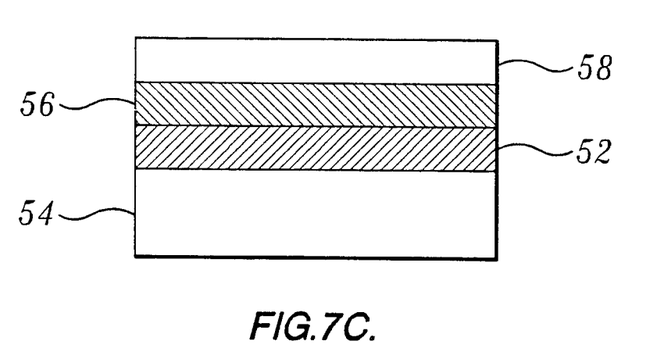

Referring to FIGS. 7A-7H, an alternative embodiment for providing channel waveguides in a dielectric layer is illustrated. Referring to FIG. 7A, dielectric layer 52 is provided on substrate 54 in a manner similar to that described above with respect to FIG. 6A. In FIG. 7B, a masking layer 56 is provided over dielectric layer 52. Masking layer 56 can be silicon nitride or titanium, and is deposited onto dielectric layer 52 using conventional techniques such as plasma enhanced vapor deposition, e-beam evaporation, or sputtering. Referring to FIG. 7C, photoresist 58, available commercially from a number of sources, such as Shipley Company, is deposited on masking layer 56, for example by spin coating in accordance with the manufacturer's specifications. Photoresist layers about 2 to 3 microns thick are suitable. Photoresist layer 58 should be baked to remove excess solvent. When baking photoresist layer 58, the conditions should be controlled such that the susceptibility of the polyimide to diffusion by the solvent is not unsatisfactorily affected. For polyimide layers about 5-6 microns thick, satisfactory results have been achieved by baking temperatures on the order of 90° C. and times on the order of 30 minutes.

Figure 7D:
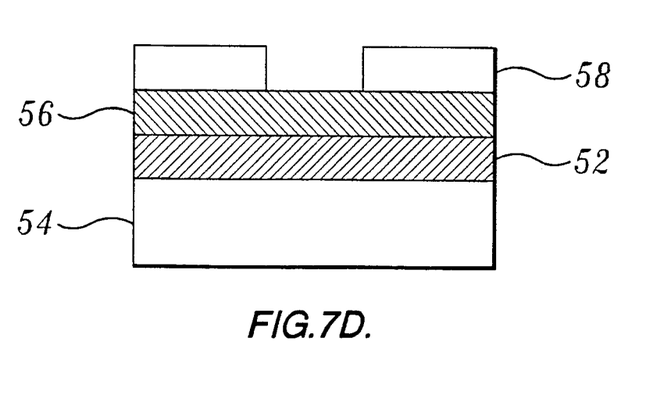
Figure 7E:
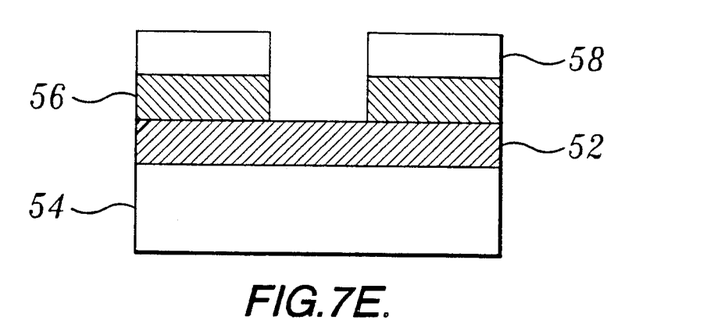
Figure 7F:
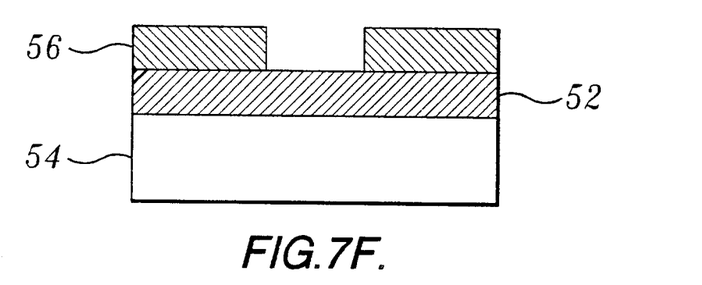

The layer of photoresist 58 is then patterned and developed using photolithographic techniques to uncover portions of underlying masking layer 56 as shown in FIG. 7D. Patterning and developing of the photoresist should be carried out in accordance with the manufacturer's specifications. The masking layer 56 is then etched, for example, under plasma or wet conditions, to remove portions thereof and uncover portions of the underlying polyimide 52. This structure is illustrated in FIG. 7E. The remaining portions of photoresist 58 are then removed by contacting them with a solvent, such as acetone. The resulting structure is shown in FIG. 7F.

Figure 7G:
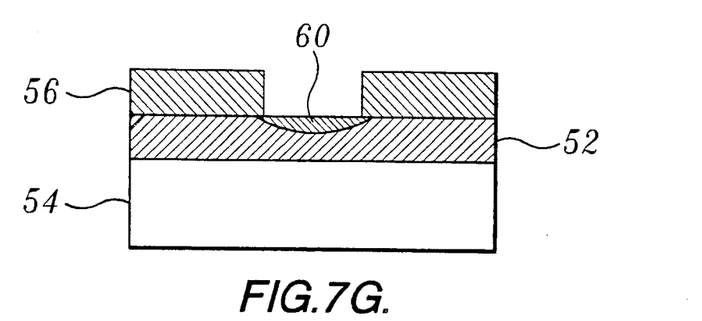

Rather than exposing the uncovered portion of the polyimide 52 to ultraviolet radiation, a dopant in solution is diffused directly into the uncovered portion of polyimide layer 52. Since the uncovered portion of the polyimide layer 52 has not been rendered resistant to diffusion by the solvent, the dopant diffuses into the polyimide layer, thus altering the index of refraction of portion 60. Unlike the process described with reference to FIGS. 6A–6D, wherein the diffusion was generally limited to a direction perpendicular to the planar surface of the polyimide layer 52, diffusion in this process is near isotropic because no portion of polyimide layer 52 has been treated to affect the rate of solvent diffusion. Accordingly, the dopant is provided in polyimide layer 52 and forms a channel waveguide in portion 60 that is in the shape of meniscus, with the upper surface being planar, not concave (see FIG. 7G).

Figure 7H:
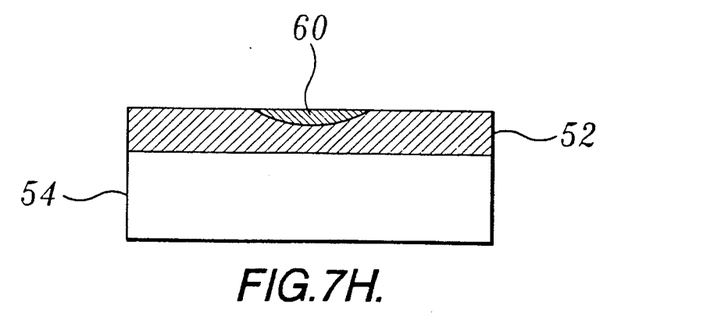

After solvent diffusion is completed, masking layer 56 is removed by plasma or wet etching. The resulting structure is illustrated in FIG. 7H. As schematically illustrated in FIG. 7H, the channel waveguides 60 provided by this alternative embodiment have a generally more rounded transverse cross-section than the waveguides 50 provided by the preferred embodiment. Depending upon the application, the shape of channel waveguides 60 may provide advantages associated with coupling to other optical devices.

While the preferred embodiment of the invention has been illustrated and described, it will be appreciated that various changes can be made therein without departing from the spirit and scope of the invention. The following examples are intended to illustrate particular embodiments of the present invention and are not intended to limit the scope of this disclosure in any way.

EXAMPLE 1

Photosensitive BTDA(benzophenone tetracarboxylic di-anhydride)-alkylated diamine-based preimidized polyimide available commercially from Ciba-Geigy Corporation under the name Probimide TM 414 was spin coated onto a three inch diameter silicon wafer which had a 15 KÅ thermal oxide layer applied thereto. The polyimide was provide by the manufacturer dissolved in 4-butyrolactone to provide a 14 weight % solids content. The spin coating was carried out at an RPM of approximately 2700 for about one minute and provided a layer of polyimide about 5.0 microns thick. The sample was then subjected to a thirty minute 150° C. convection oven bake to remove solvent from the polyimide layer. The polyimide film was exposed to a low dosage of ultraviolet radiation including a wavelength of 365 nanometers for three minutes through a conventional aligner. The dosage received by the film was approximately 1 Joule/$cm^2$ measured at 365 nanometers. The purpose of this exposure was to decrease the solubility of the polyimide in the solvent of the diffusion bath.

A known amount of a disperse red dye was added to 4-butyrolactone to form a diffusion bath.

A 1000 Å thick silicon nitride layer was then deposited over the polyimide film by plasma enhanced chemical vapor deposition. A film of Shipley Microposit TM 14-27 photoresist about 2-3 microns thick was applied by spin coating at 4000 RPMs for 30 seconds. The entire structure was then baked in a convection oven for 30 minutes at 90° C. The photoresist was then exposed to light having a wavelength of about 405 nanometers through a mask for about 6 to 8 seconds. The power of the light source was such that a dosage of about 20 millijoules/$cm^2$-micron was provided. Use of the mask resulted in exposure of portions of the photoresist which correspond with the location of the channel waveguides in the polyimide film. The photoresist was then developed in a Shipley 351 positive resist developer diluted 4 times with deionized water. The developer was maintained in contact with the photoresist for about 30 seconds. The photoresist was thereafter rinsed with deionized water and allowed to air dry.

Portions of the silicon nitride layer uncovered after the photoresist was developed were etched by an oxygen and carbon tetrafluoride ($CF_4$) plasma in a barrel etcher. The plasma was 10 volume % oxygen and 90 volume % $CF_4$. The pressure in the barrel etcher was 200 millitorr and the power setting was 200 watts. The etching uncovered portions of the polyimide layer. The photoresist was removed using an acetone wash.

Diffusion of the disperse red and 4-butyrolactone solution into the uncovered portions of the polyimide was accomplished by immersing the polyimide film in the diffusion bath for about 20 seconds at 50° C. After the diffusion was complete, the wafer surface was rinsed with methanol to remove dye and solvent. The wafers were then air dried, followed by baking on a hot plate at 150° C. for 15 minutes to remove the solvent that had diffused into the polyimide.

Figure 2:
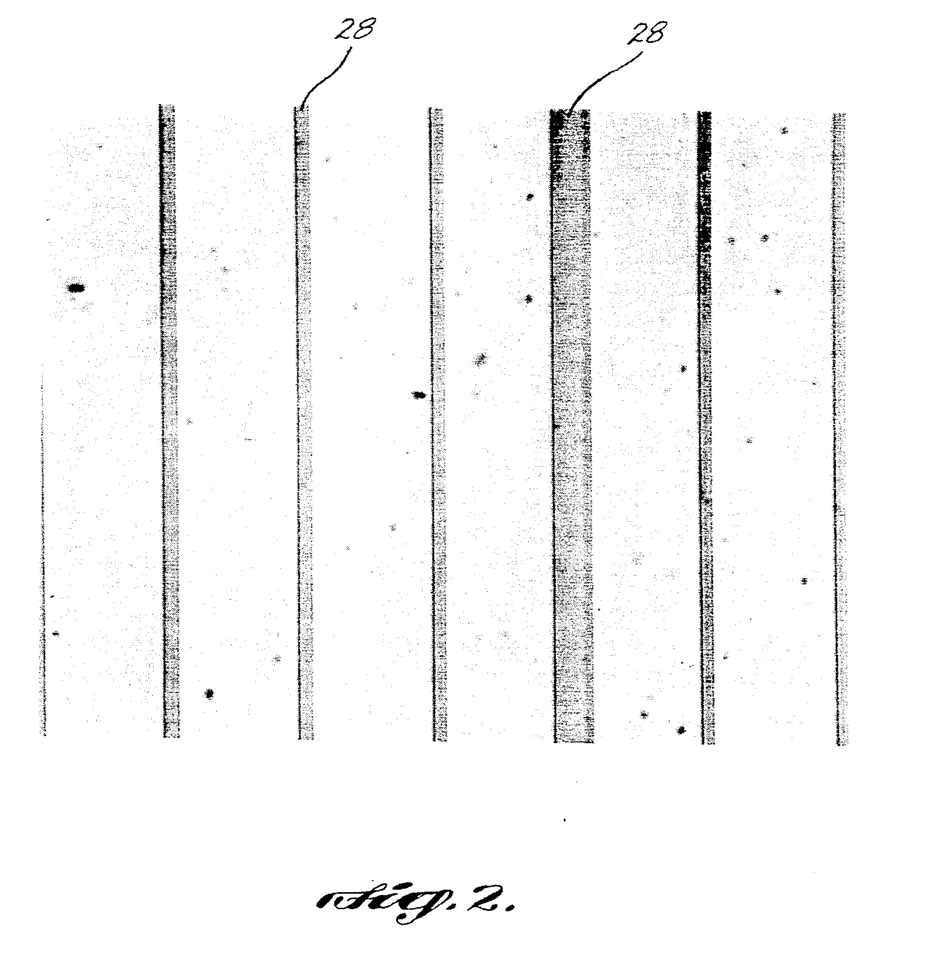
FIG. 2 is an optical photomicrograph showing the top view of channel waveguides that include a dopant formed in accordance with another embodiment of the present invention.

Optical photomicrographs were then taken, one of which is presented in FIG. 2. The channel waveguides 28 are the darker regions in the photo. Inspection of the channel waveguides reveals smooth well-defined edges. Anomalies in the waveguide that would cause scattering and leakage of light are not observed.

EXAMPLE 2

Samples of a doped polyimide were prepared by dissolving disperse red in a photosensitive BTDA(benzophenone tetracarboxylic di-anhydride)-alkylated diamine-based preimidized polyimide available commercially from Ciba-Geigy Corporation under the name Probimide TM 414. The polyimide was provided by the manufacturer dissolved in 4-butyrolactone to provide a 14 weight % solids content. The amount of disperse red dissolved in the polyimide was 10, 20, 30, 40, 50, and 70 wt. % based on total solids content of the solution. Each of the solutions was applied to a 3-inch silicon wafer coated with 15K angstroms of silicon oxide. The spin coating was carried out at an RPM of approximately 2700 for about one minute and provided a layer of polyimide and disperse red about 5.0 microns thick. The samples were then subjected to a thirty minute 150° C. convection oven bake to remove solvent from the polyimide layer. The polyimide films were exposed to a low dosage of ultraviolet radiation including a wavelength of 365 nanometers for three minutes through a conventional aligner. The dosage received by the films was approximately 1 Joule/$cm^2$ measured at 365 nanometers.

The doped polyimide films were then characterized in terms of their refractive index changes and waveguiding losses as a function of disperse red concentration in the polyimide. Refractive index measurements were carried out on a Metricon TM prism coupler model PC2000. Waveguiding losses were measured by prism coupling technique employing a 815 nanometer GaAs/AlGaAs laser light. The results are summarized in TABLE 1 below and FIGS. 3 and 4. The accuracy of the measurement technique used to measure the optical losses depicted in FIG. 4 was 0.5 dB/cm. While FIG. 4 represents the measured values, applicants make no representation with respect to values below 0.5 dB/cm, other than such values were below 0.5 dB/cm.

TABLE 1

Index of Refraction and Optical Losses for Doped Polyimide Films vs. Dopant Concentration in Polyimide

| Dopant Concentration | Index of Refraction (n) | Optical Loss dB/cm |
|---|---|---|
| 0 | 1.623 | 0 |
| 10 | 1.636 | 0.1 |
| 20 | 1.650 | 0.1 |
| 30 | 1.656 | 0.1 |
| 40 | 1.685 | 1.4 |
| 50 | 1.692 | — |
| 70 | 1.693 | — |

The data presented in TABLE 1 AND FIGS. 3 and 4 are for planar waveguides cast as doped films of polyimide, and not the channel waveguides formed in accordance with the present invention. It is believed that channel waveguides formed in polyimide with disperse red dopant will produce similar results when changes in the index of refraction and optical loss are measured as described above.

EXAMPLE 3

A three inch silicon wafer was coated with polyimide by spin coating at 3000 RPMs for 60 seconds. A layer of polyimide 4.5 microns thick resulted from the spin coating. The polyimide was rendered insoluble in 4-butyrolactone by first baking at 110° C. for 15 minutes, followed by baking in a nitrogen environment at 150° C. for 60 minutes. Using a Canon aligner the polyimide film was then exposed to a low dosage (1 Joule/cm$^2$ at 365 nanometers) of ultraviolet radiation including a wavelength of 365 nanometers for about 180 seconds. The polyimide film was then exposed through a mask to render the exposed portions resistant to diffusion by 4-butyrolactone.

The second dosage of ultraviolet radiation included a wavelength of 254 nanometers. The exposure was continued for 340 seconds at an average power of 25 milliwatts/cm$^2$ to provide a dosage of 8 Joules/cm$^2$.

A solution of disperse red in 4-butyrolactone was prepared and used as a diffusion bath. The disperse red was introduced into the portions of the polyimide that were not exposed to ultraviolet radiation by dipping the wafer in the diffusion bath. The wafer was held in the diffusion bath for 10 seconds at a temperature of 75° C. After the diffusion was completed, the surface of the polyimide was washed and dried as described in Example 1. The solvent which diffused into the polyimide was then removed by baking as described in Example 1.

Optical photomicrographs were then taken, one of which is presented in FIG. 1. The channel waveguides 20 are the darker regions in the photo. Inspection of the channel waveguides reveals smooth well-defined edges. Anomalies in the waveguide that would cause scattering and leakage of light are not observed.

EXAMPLE 4

Photosensitive BTDA(benzophenone tetracarboxylic di-anhydride)-alkylated diamine-based preimidized polyimide available commercially from Ciba-Geigy Corporation under the name Probimide TM 414 was spin coated onto three inch diameter silicon wafers which had a 15 KÅ thermal oxide layer applied thereto. The polyimide was provided by the manufacturer dissolved in 4-butyrolactone to provide a 14 weight % solids content. The spin coating was carried out at an RPM of approximately 2700 for about one minute and provided a layer of polyimide about 5.0 microns thick. The samples were then subjected to a thirty minute 150° C. convection oven bake to remove solvent from the polyimide layer. The polyimide films were exposed to a low dosage of ultraviolet radiation including a wavelength of 365 nanometers for three minutes through a conventional aligner. The dosage received by the films was approximately 1 Joule/cm$^2$ measured at 365 nanometers. The purpose of this exposure was to decrease the solubility of the polyimide in the solvent of the diffusion bath.

A known amount of a disperse red dye was added to 4-butyrolactone to form a diffusion bath.

One wafer was dipped into the diffusion bath for about 20 seconds at 50° C. After the diffusion was complete, the wafer was removed from the bath and the surface of the film rinsed with methanol to remove dye and solvent. The wafer was air dried, after which it was tested for optical loss as described below. The measured optical loss is tabulated in Table 2 for a baking temperature of 150° C. The refractive index of the sample was then measured as described above in Example 2 and it was estimated from FIG. 3, that the concentration of the disperse red in the polyimide was 3.94 wt % based on solids.

A mixture of Probimide TM 414 polyimide containing 10 wt % (based on solids) disperse red was prepared and spin coated onto 3-inch silicon wafers as described in Example 2. Individual wafers were then heated from room temperature at a rate of 5° C. per minute in a convection oven under a nitrogen atmosphere to 200° C., 250° C., 300° C., and 350° C. and then baked for 60 minutes. The wafers were removed from the oven and allowed to cool to room temperature, after which they were tested for optical loss as described below. The measured optical losses are tabulated in Table 2.

Samples of wafers coated with polyimide and treated to render the polyimide insoluble in the solvent of the diffusion bath, but not doped with disperse red were subjected to the same baking conditions as the doped wafers and tested for optical loss as described below.

Waveguiding losses were measured by prism coupling technique employing a 815 nanometer GaAs/AlGaAs laser light. The results are summarized in TABLE 2 below and FIG. 5. The accuracy of the measurement technique used to measure the optical losses depicted in FIG. 5 was 0.5 dB/cm. While FIG. 5 represents the measured values, applicants make no representation with respect to values below 0.5 dB/cm other than such values were below 0.5 dB/cm.

TABLE 2

Optical Loss for Doped and Undoped Polyimide Films vs. Polyimide Baking Temperatures

| Baking Temperature °C. | Undoped Polyimide | Doped Polyimide |
|---|---|---|
| 150 | 0.29 | 0.20 |
| 200 | 0.31 | 0.22 |
| 250 | 0.65 | 0.52 |
| 300 | 1.20 | 1.10 |
| 350 | — | 1.27 |

The embodiments of the invention in which an exclusive property or privilege is claimed are defined as follows:

1. A method for providing a channel for guiding electromagnetic waves in a substrate of a dielectric material, the method comprising the steps:
   selecting a dopant to alter the index of refraction of the dielectric material;
   selecting a solvent for introducing the dopant into the dielectric material by solvent diffusion;
   treating the dielectric material to render portions of the dielectric material resistant to diffusion by the solvent; and
   introducing the dopant into portions of the dielectric layer that have not been rendered resistant to diffusion by the solvent.

2. A method for providing a channel for guiding electromagnetic waves in a substrate of a dielectric material, the method comprising the steps:
   exposing portions of the dielectric material to radiation through a mask; and
   introducing a dopant into portions of the dielectric material that were not exposed to radiation, the dopant altering the index of refraction of the dielectric material.

3. The method of claim 2, wherein the radiation has wavelengths in the ultraviolet region of the spectrum.

4. The method of claim 2, wherein the dielectric material is a polyimide.

5. The method of claim 2, wherein the dopant is introduced into the dielectric material by solvent diffusion.

6. The method of claim 5, wherein the diffusion of dopant into the dielectric material is restricted by the portions of the dielectric material exposed to the radiation.

7. A waveguide for electromagnetic waves comprising:
   a polyimide substrate; and
   a channel for guiding electromagnetic waves, the channel being defined in the polyimide and including a dopant that changes the index of refraction of the polyimide, portions of the polyimide around the channel being substantially free of the dopant.

8. The waveguide of claim 7, wherein the channel waveguide has a transverse cross-section in the shape of a rectangle.

9. The waveguide of claim 7, wherein loss of transmitted electromagnetic waves from the channel is less than about 0.5 dB/cm.

10. A waveguide for electromagnetic waves comprising:
    a substrate of a dielectric material; and
    a channel for guiding electromagnetic waves defined in the dielectric material and including a dopant that changes the index of refraction of the dielectric material, the channel having a transverse cross-section substantially in the shape of a rectangle, portions of the dielectric material around the channel being substantially free of the dopant.

11. A waveguide for electromagnetic waves comprising:
    a substrate of a dielectric material; and
    a channel for guiding electromagnetic waves defined between doped portions of the dielectric material, the doped portions of the dielectric material having an index of refraction at least about 0.01 different from the index of refraction of the dielectric material in the channel.

12. The waveguide of claim 11, wherein the dielectric material is a polyimide.

13. The waveguide of claim 11, wherein the waveguide has a transverse cross-section substantially in the shape of a rectangle.

14. A method for providing a channel for guiding electromagnetic waves in a substrate of polyimide, the method comprising the steps:
    depositing a masking material on the polyimide;
    patterning the masking material to uncover a portion of the polyimide; and
    introducing a dopant into the uncovered portion of the polyimide, the dopant altering the index of refraction of the polyimide.

15. The method of claim 14, wherein the dopant effectively alters the index of refraction of the polyimide by at least about 0.01.

16. The method of claim 14, wherein the dopant is introduced into the polyimide by solvent diffusion.

17. The method of claim 16, wherein the diffusion of dopant into the polyimide is isotropic.

18. A multi-chip module comprising:
    a layer of polyimide; and
    a channel for guiding electromagnetic waves defined within the polyimide and including a dopant that changes the index of refraction of the polyimide, portions of the polyimide around the channel being substantially free of the dopant.

19. The multi-chip module of claim 18, wherein the index of refraction of the channel differs from the index of refraction of the polyimide by at least about 0.01.

20. The multi-chip module of claim 18, wherein the channel waveguide has a transverse cross-section substantially in the shape of a rectangle.

21. A multi-chip module comprising:
    a layer of dielectric material; and
    a channel for guiding electromagnetic waves defined between doped portions of the dielectric material, the doped portions of the dielectric material having an index of refraction at least about 0.01 different from the index of refraction of the dielectric material in the channel.

22. The multi-chip module of claim 21, wherein the channel waveguide has a cross-section in the shape of a rectangle.

23. A multi-chip module comprising:
    a layer of dielectric material; and
    a channel for guiding electromagnetic waves defined in a dielectric material and including a dopant that changes the index of refraction of the dielectric material, the channel having a transverse cross-section substantially in the shape of a rectangle, portions of the dielectric material around the channel being substantially free of the dopant.

24. A waveguide for electromagnetic waves comprising:
    a polyimide substrate; and
    a channel for guiding electromagnetic waves, the channel being defined in the polyimide and including a dopant that changes the index of refraction of the polyimide, wherein the loss of transmitted electromagnetic waves from the channel is less than about 0.5 dB/cm.

25. A multi-chip module comprising:
    a layer of polyimide; and
    a channel for guiding electromagnetic waves defined within the polyimide and including a dopant that changes the index of refraction of the polyimide, the index of refraction of the doped polyimide in the channel having an index of refraction at least about 0.01 different from the index of refraction of the polyimide.

* * * * *

UNITED STATES PATENT AND TRADEMARK OFFICE
CERTIFICATE OF CORRECTION

PATENT NO. : 5,168,542

DATED : December 1, 1992

INVENTOR(S) : K. K. Chakravorty et al.

It is certified that error appears in the above-identified patent and that said Letters Patent is hereby corrected as shown below:

| COLUMN | LINE | |
|---|---|---|
| 9 | 48 & 49 | "150° C" should read ---150°C--- |
| 12 | 6 & 7 | "150° C" should read ---150°C--- |
| 12 | 35 & 36 | "200° C" should read ---200°C--- |
| [56] "U.S. Ref. Cited" | 2nd Ref. | Please add --4,940,302  7/1990  Houk et al.-- |
| [56] "Other Information" | 1st Publ. | Please add --Organic Nonlinear Optical Waveguides Formed by Solvent-Assisted Indiffusion, *Electronics Letters*, 17th July, 1986, Vol. 22, No. 16, pgs. 789-790, Goodwin et al.-- |
| [56] "Other Information" | 2nd Publ. | Please add --On the Feasibility of Through-Wafer Optical Interconnects for Hybrid Wafer-Scale-Integrated Architectures, L. A. Hornak and S. K. Tewksbury, *Optical Engineering*, October 1986, Vol. 25, No. 10, *IEEE Transactions on Electron Devices*, Vol. Ed-34, No. 7, July 1987.-- |
| [56] "Other Information" | 3rd Publ. | Please add --Photo-Induced Self-Condensation, a Technique for Fabricating Organic Lightguide Structures, H. Franke and W. Heuer, Fachbereich Physik, Universitat Osnabruck, Society of Photo-Optical Instrumentation Engineers, Vol. 651 *Integrated Optical Circuit Engineering III* (1986), pgs. 120-125.-- |

UNITED STATES PATENT AND TRADEMARK OFFICE
CERTIFICATE OF CORRECTION

PATENT NO. : 5,168,542
DATED : December 1, 1992
INVENTOR(S) : K. K. Chakravorty et al.

It is certified that error appears in the above-identified patent and that said Letters Patent is hereby corrected as shown below:

| COLUMN | LINE | |
|---|---|---|
| [56] "Other Information" | 4th Publ. | Please add --Optical Waveguiding in Polyimide, H. Franke, J. D. Crow, IBM T. J. Watson Research Center, Yorktown Heights, New York, Society of Photo-Optical Instrumentation Engineers, Vol. 651 *Integrated Optical Circuit Engineering III* (1986), pgs. 102-107.-- |
| [56] "Other Information" | 5th Publ. | Please add --Optical Waveguiding in Polyimide II, H. Francke, G. Knabke and R. Reuter, F. B. Physik, Universitat Osnabruck, FRB, Society of Photo-Optical Instrumentation Engineers, Vol. 682, *Molecular and Polymeric Optoelectronic Materials: Fundamentals and Applications* (1986), pgs. 191-195.-- |
| [56] "Other Information" | 6th Publ. | Please add --Polymeric Non-Linear Optical Waveguides, J. Brettle, N. Carr, R. Glenn, M. Goodwin and C. Trundle, Plessey Research Ltd., Allen Clark Research Centre, Caswell, Towcester, Northants, England, Society of Photo-Optical Instrumentation Engineers, Vol. 824 *Advances in Nonlinear Polymers and Inorganic Crystals, Liquid Crystals, and Laser Media* (1987), pgs. 171-177.-- |

UNITED STATES PATENT AND TRADEMARK OFFICE
CERTIFICATE OF CORRECTION

PATENT NO. : 5,168,542
DATED : December 1, 1992
INVENTOR(S) : K. K. Chakravorty et al.

It is certified that error appears in the above-identified patent and that said Letters Patent is hereby corrected as shown below:

COLUMN    LINE

[56] "Other Information"    7th Publ.    Please add --Dependence of Precursor Chemistry and Curing Conditions on Optical Loss Characteristics of Polyimide Waveguides, C. P. Chien and K. K. Chakravorty, Optical Thin Films III: New Developments, Society of Photo-Optical Instrumentation Engineers, Vol. 1323, December 17, 1990, pgs. 338-347.--

[56] "Other Information"    8th Publ.    Please add --Waveguiding Characteristics in Polyimide Films With Different Chemistry of Formation, K. K. Chakravorty and C. P. Chien, Microelectronic Interconnects and Packages: Optical and Electrical Technologies, International Symposium on Advances in Interconnection and Packaging, April 17, 1991, Society of Photo-Optical Instrumentation Engineers, Vol. 1389, pgs. 559-567.--

UNITED STATES PATENT AND TRADEMARK OFFICE
CERTIFICATE OF CORRECTION

PATENT NO. : 5,168,542　　　　　　　　　　　　　　　Page 4 of 4

DATED : December 1, 1992

INVENTOR(S) : K.K. Chakravorty et al.

It is certified that error appears in the above-identified patent and that said Letters Patent is hereby corrected as shown below:

| | | |
|---|---|---|
| [56] "Other Information" | 9th Publ. | Please add --Optical Interconnects For High Speed Computing, P. R. Haugen, S. Rychnovsky, A. Husain and L. D. Hutcheson, Optical Engineering, Vol. 25, No. 10, October 1986, pgs. 1076-1085.-- |

Signed and Sealed this

Seventh Day of December, 1993

*Attest:*

BRUCE LEHMAN

*Attesting Officer*　　　　*Commissioner of Patents and Trademarks*